(12) United States Patent
Nana

(10) Patent No.: US 7,619,388 B1
(45) Date of Patent: Nov. 17, 2009

(54) DETACHABLE BACK-UP BATTERY PACK FOR CELL PHONE

(76) Inventor: Prince K. Nana, 2219 NE. Greenville Blvd., Greenville, NC (US) 27855

( * ) Notice: Subject to any disclaimer, the term of this patent is extended or adjusted under 35 U.S.C. 154(b) by 317 days.

(21) Appl. No.: 11/714,476

(22) Filed: Mar. 5, 2007

(51) Int. Cl.
*H01M 10/46* (2006.01)
(52) U.S. Cl. ...................................................... 320/114
(58) Field of Classification Search ................. 320/103, 320/107, 111, 112, 114, 115, 116; 379/433.08; D13/103, 107, 108; 307/150; 429/96–100
See application file for complete search history.

(56) References Cited

U.S. PATENT DOCUMENTS

| | | | | |
|---|---|---|---|---|
| 5,664,292 A | * | 9/1997 | Chen | 24/3.11 |
| 5,859,481 A | * | 1/1999 | Banyas | 307/64 |
| 2003/0218445 A1 | * | 11/2003 | Behar | 320/114 |
| 2005/0088141 A1 | * | 4/2005 | Lee et al. | 320/114 |
| 2005/0231161 A1 | * | 10/2005 | Jones et al. | 320/114 |
| 2007/0236180 A1 | * | 10/2007 | Rodgers | 320/115 |

* cited by examiner

*Primary Examiner*—Edward Tso

(57) ABSTRACT

A back-up battery pack for use to charge a cell phone when the cell phone battery is drained allowing the cell phone to be continuously used without interruption.

6 Claims, 3 Drawing Sheets

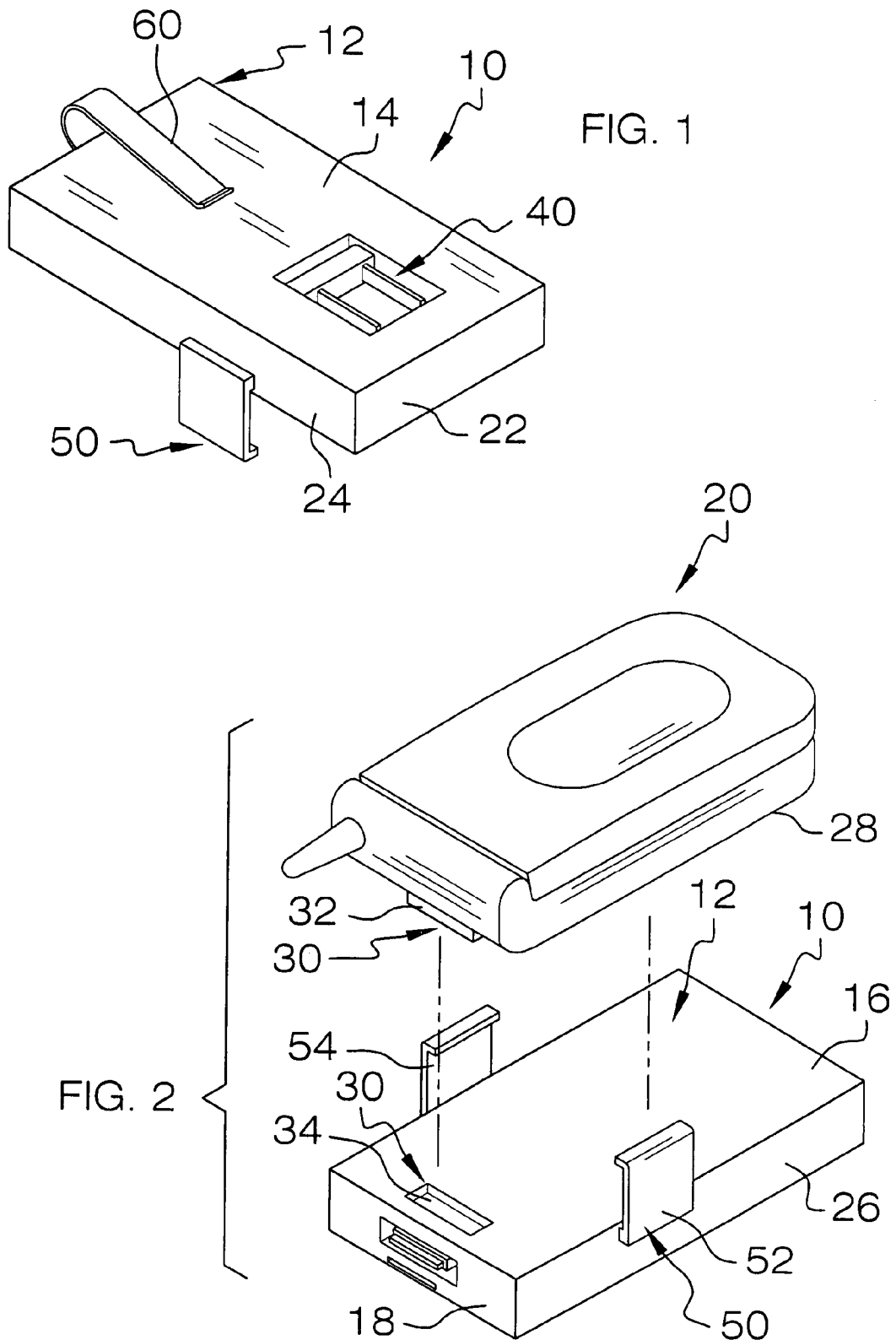

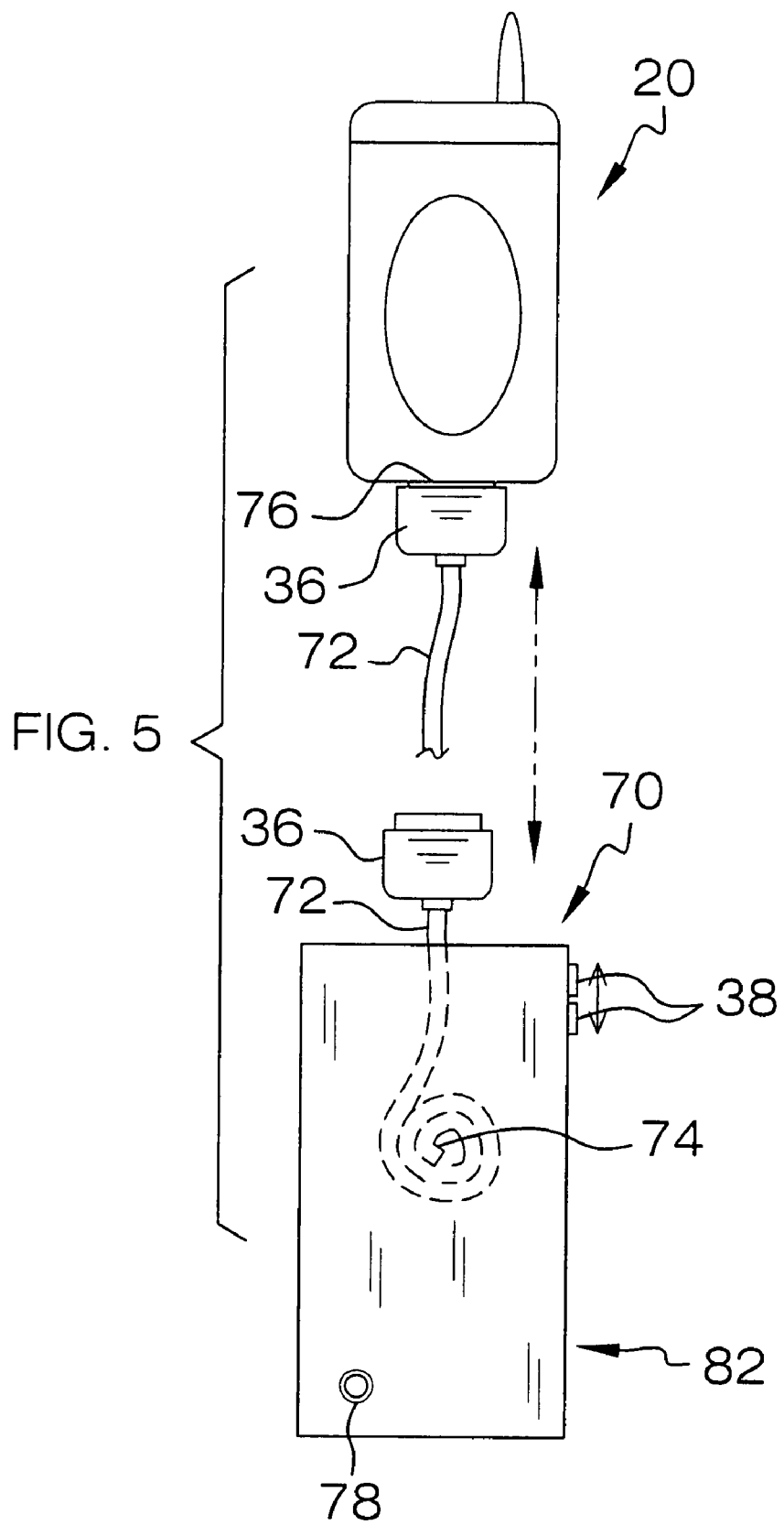

DETACHABLE BACK-UP BATTERY PACK FOR CELL PHONE

FIELD OF THE INVENTION

The present invention generally relates to a cell phone accessory and more particularly, relates to a back-up battery pack for a cell phone.

BACKGROUND OF THE INVENTION

The ever popular use of cell phones have become one of the most significant events of the twenty-first century. Cell phones have become so popular that it has become a necessity for everyone to communicate with other people. In certain situations, cell phones have replaced land based phones as a person's primary means of communication.

All cell phones operates on a rechargeable battery pack which needs to be charged every few days. When a person forgets to recharge his cell phone battery, the loss of communication capability by cell phone can be a most inconvenient and troublesome experience. It is therefore desirable to provide a device that can be used with a cell phone to prevent the loss of battery power for the cell phone.

It is therefore an object of the present invention to provide a back-up battery pack for cell phone that does not have the drawbacks or shortcomings of conventional battery packs.

It is another object of the present invention to provide a back-up battery pack for cell phone that can be conveniently carried by a user.

It is a further object of the present invention to provide a back-up battery pack for cell phone that can be actually attached to a cell phone.

SUMMARY OF THE INVENTION

In accordance with the present invention, a back-up battery pack for cell phone is provided.

In a preferred embodiment, the present invention back-up battery pack for cell phone is constructed of a battery casing of generally rectangular shape that has a front surface, a back surface, a top end surface, a bottom end surface and two side surfaces; a rechargeable battery pack in the casing; an electrical connection means on the casing for providing electrical communication with the cell phone; a mechanical connection means on each of the two side surfaces adapted for holding the cell phone in a piggy-back position with the back surface of the casing contacting a back surface of the cell phone; an electrical plug pivotably mounted in the front surface of the casing providing electrical communication between the rechargeable battery pack and a household current from an electrical outlet.

BRIEF DESCRIPTION OF THE DRAWINGS

The invention will now be described, by way of example, with reference to the accompanying drawings, in which:

FIG. 1 is a perspective view of the present invention back-up battery pack for cell phone showing the front surface.

FIG. 2 is a perspective view of the present invention back-up battery pack for cell phone showing the back surface and a cell phone ready to be mounted to the back surface.

FIG. 5 is a plane view of the alternate embodiment of the present invention back-up battery pack and a cell phone which the battery pack is connected thereto.

DETAILED DESCRIPTION OF THE PREFERRED EMBODIMENT

The present invention discloses a back-up battery pack for cell phone that can be conveniently attached to the cell phone such that a person would never run out of battery power on the cell phone.

The present invention back-up battery pack for cell phone is a portable recharger for a cell phone that does not require access to an external source of power. The present invention back-up battery pack can be provided as an original equipment market part or can be provided as an after market part. The OEM version consists of a modified cell phone and a battery cartridge. The battery cartridge includes a case made of high impact plastic, internal battery contacts, internal wire, and a flip-up plug built into the top of the unit. To prepare the unit for use, the battery cartridge can be plugged into the cell phone by engaging a male plug on the cell phone with a female receptacle on the back-up battery pack. An electrical plug, that functions pivotably is attached to a front surface of the back-up battery pack such that the plug is kept in a stowed away position, flush against the side of the case most of the time when not in use. When the user needs to recharge the back-up battery pack, the plug can be flipped 450 into a use position and then plugged into any electrical outlet.

The OEM version of the present invention back-up battery pack can be attached to the cell phone when the cell phone is out of battery power in a piggy-pack position. An after market version of the present invention back-up battery pack would consist of a retractable flash extendable wire and plug which can be extended to plug into the regular charge receptacle on the cell phone case.

The present invention back-up battery pack for cell phone fulfils the need for a device that can recharge a cell phone without connection to an external power source such that the portable use of the cell phone is still possible even when the battery pack inside the cell phone is dead. The appealing features of the present invention back-up battery pack for cell phone are its convenience, money-savings, reliability, and ease of use. By using the OEM version of the back-up battery, the user can simply plug the cell phone into the back-up battery pack such that recharging begins immediately and allows the user to quickly resume any conversation that had been interrupted by a failing battery.

By using the present invention back-up battery pack for cell phone, a user can avoid being cut off from friends, family, or co-workers because of a cell phone with a drained battery. It is especially useful for keeping in touch during a camping trip, or a long distance car trip.

Figure 4:
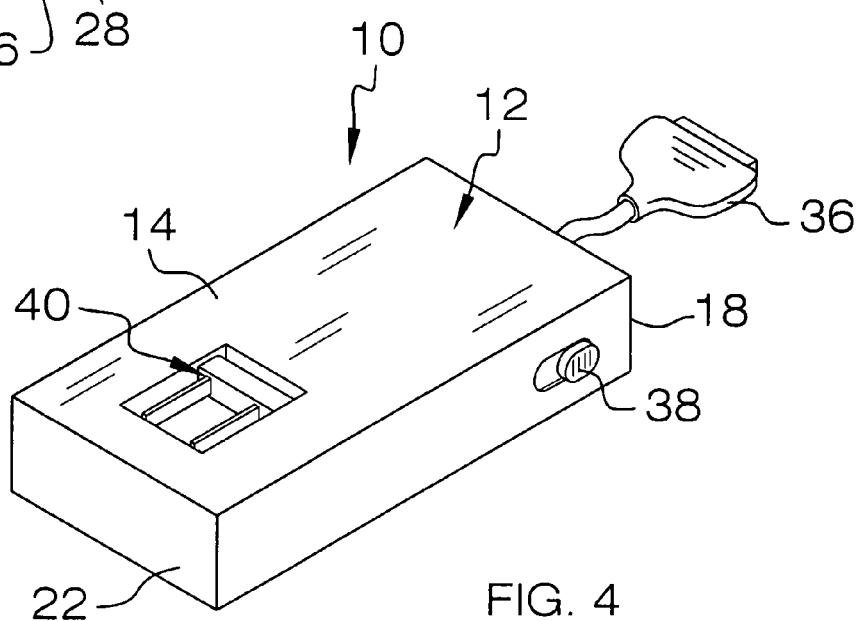
FIG. 4 is a perspective view of the present invention back-up battery pack for cell phone in an alternate embodiment.

Referring initially to FIG. 1, wherein a present invention back-up battery pack 10 for cell phone 20 is shown. The back-up battery pack 10 is constructed of a battery casing 12 of generally rectangular shape that has a front surface 14, a back surface 16, a top end surface 18, a bottom end surface 22, and two side surfaces 24 and 26. A rechargeable battery pack (not shown) is contained in the casing 12, and an electrical connection means 30, as shown in FIG. 2, is provided on the casing 12 for providing electrical communication between the back-up battery pack 10 and the cell phone 20. In the embodiment shown in FIG. 2, a male connector 32 is provided on the cell phone 20, while a female connector 34 is provided on the casing 12 for providing electrical communication between the two. It should be noted that the configuration or the embodiment shown in FIG. 2 is for OEM equipment. Another embodiment that is more suitable for after market use of the present invention back-up battery pack 10 is shown in FIG. 4, wherein the electrical communication means 30 consists of a retractable/extendable connector 36 which can be readily plugged into the regular charge receptacle of the cell phone 20. In this second embodiment, a sliding switch 38 is used in conjunction with the retractable/extendable connector 36 such that the connector 36 can be properly stowed away inside the casing 12 when not in use.

A mechanical connection means 50, shown in FIGS. 1 and 2 as clips 52, 54 is further provided on each side of the two side surfaces 24 and 26. The two clips 52,54 are adapted for holding the cell phone 20 in piggy-back position with the back surface 16 of the casing 12, contacting a back surface 28 of the cell phone 20. This is better shown in FIG. 3.

In order to recharge the present invention back-up battery pack 10, an electrical plug 40 is pivotally mounted in the front surface 14 of the casing 12 to provide electrical communication between the rechargeable battery pack (not shown) and a household current from an electrical outlet (not shown).

Figure 3:
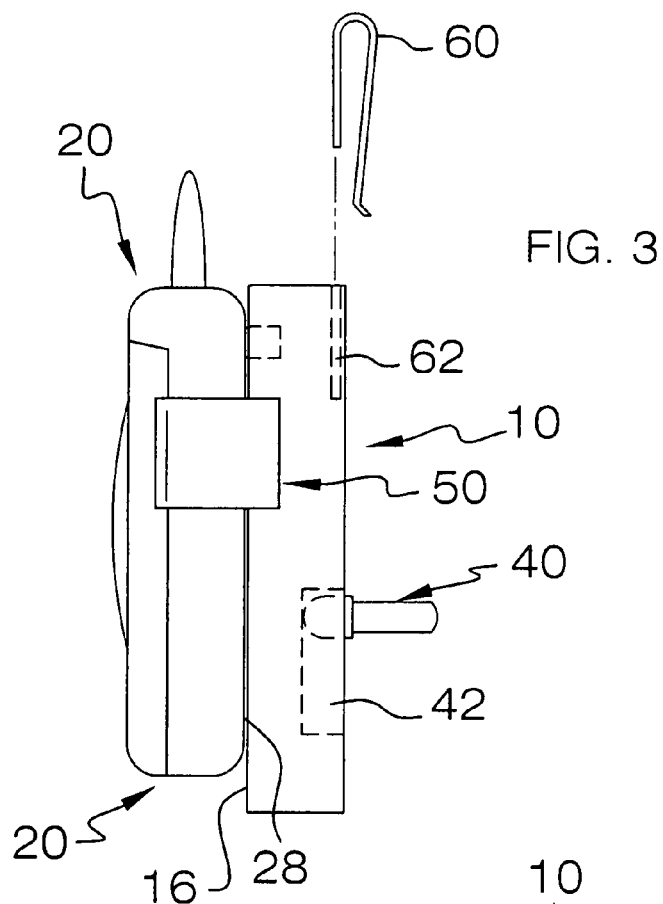
FIG. 3 is a side view of the present invention back-up battery pack for cell phone.

Also shown in FIGS. 1 and 3 is a belt clip 60 which is inserted in a slot 62 formed in the top end surface 18 of the casing 12. The belt clip 60 allows the back-up battery pack 10 to be conveniently carried on a person's belt, or any other part of the clothing, or on a purse. The electrical plug 40 can be advantageously stowed away in a recessed 42 that is provided in the front surface 14 of the casing 12.

In an alternate embodiment, shown in FIG. 5, the present invention back-up battery pack 70 can be advantageously provided with the retractable/extendable connector 36 equipped with a length of wire 72 which may be coiled on a roller 74 when the connector 36 is not in use and retracted by the sliding switch 38. The connector 36 can be easily plugged into a regular charge socket 76 on the cell phone 20. Further shown in FIG. 5, the back-up battery pack 70 may further include an indicator light 78 which lights up when the battery is close to be drained inside the casing 82.

The present invention back-up battery pack for cell phone has therefore been amply descried in two embodiments and shown in FIGS. 1-5.

While the preferred embodiments of the invention have been described above, it will be recognized and understood that various modifications can be made in the invention and the appended claims are intended to cover all such modifications which may fall within the spirit and scope of the invention.

What is claimed is:

1. A back-up battery pack for cell phone comprising:
    a battery casing of generally rectangular shape having a front surface, a back surface, a top end surface, a bottom end surface and two side surfaces;
    a rechargeable battery pack in said casing;
    an electrical connection means on said casing for providing electrical communication with said cell phone;
    a mechanical connection means on each of said two side surfaces adapted for holding said cell phone in a piggy-back position with said back surface of said casing contacting a back surface of said cell phone; and
    an electrical plug pivotably mounted in said front surface of the casing providing electrical communication between said rechargeable battery pack and a household current from an electrical outlet.

2. The back-up battery pack for cell phones according to claim 1 further comprising a belt clip mounted on the battery casing.

3. The back-up battery pack for cell phones according to claim 1, wherein said mechanical connection means further comprising two clips attached to the two side surfaces for holding a cell phone casing thereinbetween.

4. The back-up battery pack for cell phones according to claim 1, wherein said electrical connection means further comprising a male connector on the cell phone and a female connector on the battery casing.

5. The back-up battery pack for cell phones according to claim 1, wherein said electrical connections means further comprising a retractable/extendable connector on the battery casing for plugging into a charge socket on the cell phone.

6. The back-up battery pack for cell phones according to claim 1 further comprising a low battery power indicator light on the battery casing.

* * * * *